Sept. 15, 1959 　　　J. R. PARSONS 　　　2,904,751
ELECTRICAL MEASURING APPARATUS
Filed Aug. 27, 1953 　　　　　　　　　　　　　5 Sheets-Sheet 1

*INVENTOR.*
J. R. PARSONS

BY *Hudson & Young*

ATTORNEYS

Sept. 15, 1959 J. R. PARSONS 2,904,751
ELECTRICAL MEASURING APPARATUS
Filed Aug. 27, 1953 5 Sheets-Sheet 5

FIG. 8.

INVENTOR.
J. R. PARSONS
BY *Hudson & Young*
ATTORNEYS

United States Patent Office 2,904,751
Patented Sept. 15, 1959

2,904,751

ELECTRICAL MEASURING APPARATUS

James R. Parsons, Bartlesville, Okla., assignor to Phillips Petroleum Company, a corporation of Delaware Application August 27, 1953, Serial No. 376,960

19 Claims. (Cl. 324—61)

This invention relates to apparatus for measuring electrical properties of materials. In another aspect, it relates to impedance measuring apparatus. In still another aspect, it relates to apparatus for measuring the dielectric properties of materials.

The measurement of the dielectric properties of materials has become a valuable industrial procedure for determining the composition of the materials. Such a procedure is particularly useful in determining the water content in petroleum and petroleum products since the dielectric constant of water is approximately 81, whereas the dielectric constant of petroleum and petroleum products is of the general order of 2 to 3. For example, in transporting gasoline through pipelines it is desirable to dehydrate the gasoline to reduce corrosion of the pipeline. The desiccants employed for this purpose generally lose their effectiveness after a certain length of time so that it becomes desirable to have a measurement of the water content in the gasoline stream after it is passed through the desiccants in order to determine when the desiccants need to be replaced. While chemical methods are available for determining small amounts of water in hydrocarbons, these chemical methods require a skilled operator and are not too rapid. It has been found, however, that an accurate determination of the water content in a hydrocarbon stream can be made in a rapid manner by measuring the dielectric properties of the stream. Such a measurement can be made with apparatus constructed in accordance with the present invention.

Accordingly, it is an object of this invention to provide an improved form of apparatus for measuring the dielectric properties of a material in terms of the capacitance of a condenser having the material being measured as the dielectric thereof.

Another object is to provide a system for measuring liquid level in terms of the capacitance of a pair of spaced condenser elements positioned whereby the liquid being measured forms the dielectric between the elements.

A further object is to provide impedance measuring apparatus which incorporates temperature compensating means.

The apparatus of the present invention comprises, generally, a probe element in the form of a pair of spaced electrodes positioned such that the material under measurement can be deposed therebetween. This probe element forms one arm of a bridge circuit having a source of high frequency oscillations applied across opposite terminals thereof. This bridge circuit also includes a pair of rectifiers such that any electrical unbalance of the bridge is detected in terms of a direct potential which can be applied to suitable indicating and recording apparatus. In one particular embodiment of the apparatus of this invention, a servo system is provided to maintain the bridge in electrical balance at all times, the measured capacitance being a function of the servo output. Because the dielectric properties of many materials vary with temperature, it is sometimes necessary to compensate the bridge circuit for temperature variations. This is accomplished in accordance with the present invention by including one or more temperature compensating resistors in circuit with the probe element, these resistors being maintained at the same temperature as the probe element.

Other objects, advantages, and features of this invention should become apparent from the following detailed description taken in conjunction with the accompanying drawing in which.

Figure 1:
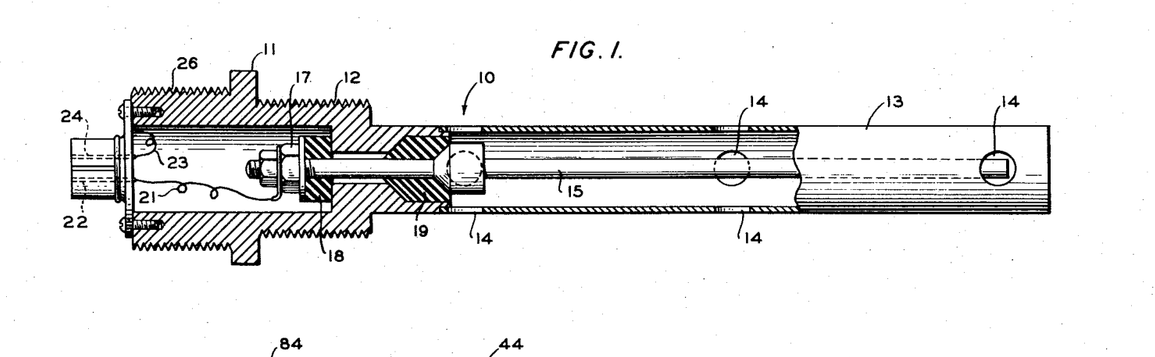
Figure 1 is a view, shown partially in section, of a probe element which is useful in making dielectric measurements.

Referring now to the drawing in detail, and to Figure 1 in particular, there is shown a probe 10 which includes a base 11 having a threaded portion 12 which enables the probe to be inserted into a tank, conduit, or the like containing the fluid under measurement. An elongated tube 13 is attached to base 11 and is provided with a plurality of openings 14 such that the interior of tube 13 is filled with the material in which probe 10 is inserted. An elongated electrode 15 also is attached to base 11 and extends axially of tube 13. Electrode 15 is threaded at one end and a nut 17 is attached thereto to retain electrode 15 in position with respect to base 11. Insulating gaskets 18 and 19 are positioned between electrode 15 and base 11 to provide a fluid-tight seal. A lead 21 extends between electrode 15 and a first external connecting prong 22. A lead 23 extends between a second external prong 24 and base 11, the latter being connected directly to tube 13. Base 11 is provided with a second threaded portion 26 to which a connecting conduit can be threaded if it is desired to maintain a fluid-tight seal about the electrical leads which connect prongs 22 and 24 to the measuring circuit.

Figure 2:
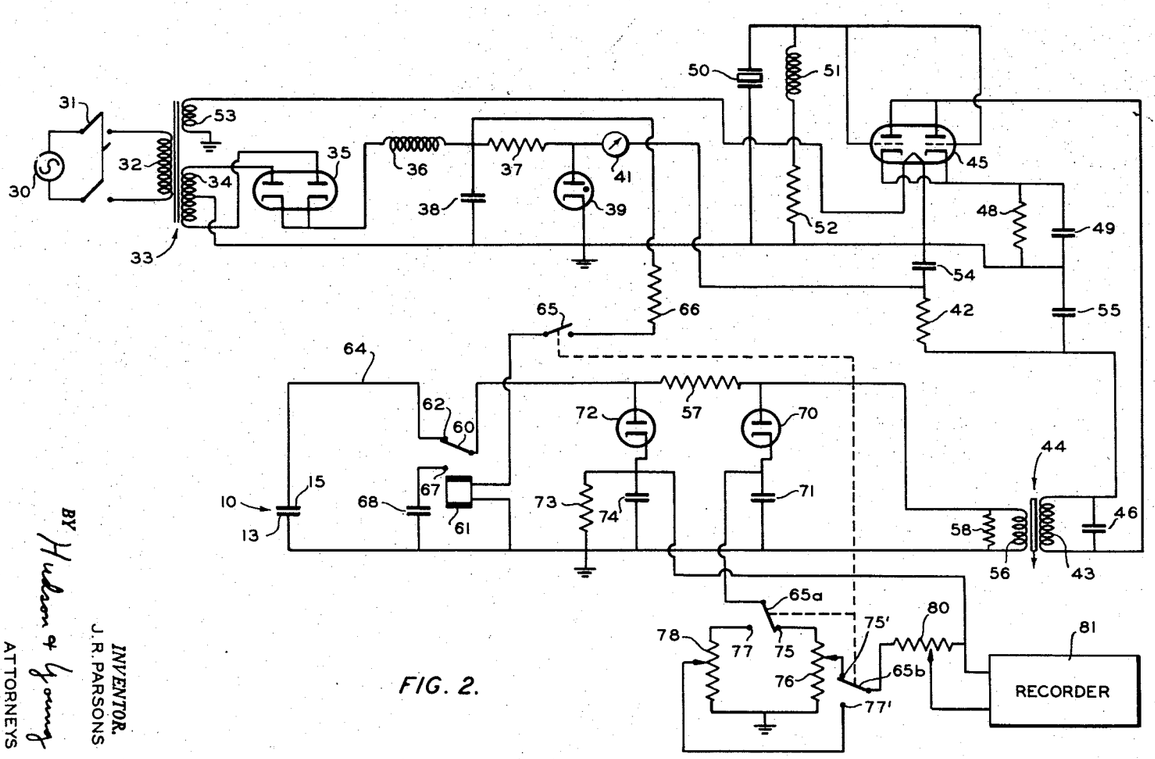
Figure 2 is a schematic circuit diagram of impedance measuring apparatus constructed in accordance with this invention.

In Figure 2 there is illustrated an electric circuit adapted to measure the capacitance of the condenser element formed by tube 13 and electrode 15. This circuit is energized by a source of alternating current 30 which is connected by a switch 31 across the primary winding 32 of a transformer 33. The end terminals of a first secondary winding 34 on transformer 33 are connected to the respective anodes of a double diode 35, the center tap of transformer winding 34 being grounded. The two cathodes of double diode 35 are connected to one another and to one terminal of an inductor 36. The second terminal of inductor 36 is connected to one terminal of a resistor 37 and is grounded through a capacitor 38. A voltage regulator tube 39 has the anode thereof connected to the second terminal of resistor 37 and the cathode thereof connected to ground. The anode of tube 39 is connected through a milliammeter 41 and a resistor 42 to one terminal of the primary winding 43 of a transformer 44. The second end terminal of transformer winding 43 is connected to the anodes of a double vacuum tube triode 45. A capacitor 46 is connected in shunt with transformer winding 43. The cathodes of double triode 45 are connected to one another and to ground through a cathode resistor 48 which is shunted by a capacitor 49. The control grids of double triode 45 are connected to one another and to one terminal of a crystal 50, the second terminal of crystal 50 being connected to ground. An inductor 51 and a resistor 52 are connected in series relation with one another and the unit of inductor 51 and resistor 52 is connected in shunt with crystal 50. Heater current for double triode 45 is provided by a second secondary winding 53 on transformer 33, transformer winding 53 being connected across the common cathode heater of double triode 45. A capacitor 54 is connected between ground and the junction between milliammeter and resistor 42. A capacitor 55 is connected between ground and the junction between resistor 42 and transformer winding 43.

One terminal of the secondary winding 56 of transformer 44 is connected to the first terminals of a resistor 57 and the second end terminal of transformer winding 56 is grounded. A low value resistor 58 is connected in shunt with transformer winding 56. The second terminal of resistor 57 is connected to a relay operated switch arm 60. In the absence of current being supplied to the relay coil 61 associated with switch arm 60, switch arm 60 normally engages a first contact 62 which is connected by a lead 64 to electrode 15 of probe 10. One terminal of relay coil 61 is grounded and the second terminal thereof is connected through a switch 65 and a resistor 66 to the junction between resistor 37 and inductor 36. Closure of switch 65 thus results in current being supplied to relay coil 61 which causes switch arm 60 to engage a second contact 67 which is connected to the first terminal of a condenser 68, the second terminal of condenser 68 being grounded. The first terminal of resistor 57 is connected to the anode of a diode 70, and the cathode of diode 70 is connected to ground through a capacitor 71. The second terminal of resistor 57 is connected to the anode of a diode 72 and the cathode of diode 72 is connected to ground through a capacitor 74 which is shunted by a resistor 73. The junction between diode 70 and capacitor 71 is connected to a switch arm 65a. In its first position, switch arm 65a engages a contact 75 which is connected to one end terminal of a potentiometer 76; and in its second position, switch arm 65a engages a contact 77 which is connected to one end terminal of a potentiometer 78, the second end terminals of potentiometers 76 and 78 being grounded. The contactor of potentiometer 76 is connected to a switch contact 75' and the contactor of potentiometer 78 is connected to a switch contact 77'. A switch arm 65b engages contact 75' in its first position and engages contact 77' in its second position. Switch arm 65b is connected to one end terminal of a potentiometer 80, the contactor of which is connected to one input terminal of a recorder 81. The second input terminal of recorder 81 is connected to the second end terminal of potentiometer 80 and to the cathode of diode 72. Switch 65 and switch arms 65a and 65b are mechanically coupled such that when switch 65 is open, switch arm 65a engages contact 75 and switch arm 65b engages contact 75'. Lead 64 preferably is contained within a shielded cable if probe 10 is positioned remotely from the remainder of the detecting circuit.

The operation of the circuit illustrated in Figure 2 should now become apparent. Double diode 35 serves as a full-wave rectifier. Inductor 36, resistor 37, and capacitor 38 filter the output of diode rectifier 35, and voltage regulating tube 39 maintains a constant positive potential on the anode of triode 45. This positive potential is applied to the anodes of double triode 45. Double triode 45 and the circuit elements associated therewith function as an oscillator, the frequency of which is controlled by crystal 50. Milliammeter 41 facilitates tuning of the oscillator because a minimum current flows therethrough when the oscillator is tuned to its resonant frequency which preferably is in the radio-frequency range. The output of this oscillator is applied through transformer 44, which can be slug tuned, to the bridge circuit which has probe 10 connected therein. The end terminals of transformer winding thereby form output terminals of a source of electrical oscillations.

From an inspection of the circuit illustrated in Figure 2, it can be seen that the voltage across transformer winding 56 is applied across series connected resistor 57 and capacitor 10 which form two arms of the bridge circuit. The other two arms of the bridge circuit comprise the impedance elements formed by the two sections of potentiometer 76 on opposite side of the contactor thereof. Recorder 81 effectively measures the potential difference between the junction of resistor 57 and probe 10 as one point and the contactor of potentiometer 76 as the other point. The purpose of rectifiers 70 and 72 is to convert this bridge unbalance from alternating to direct current to facilitate measurement on direct potential recorder 81. Potentiometer 80 serves to adjust the sensitivity of recorder 81. In operation, the bridge circuit can be balanced initially by adjustment of the contactor of potentiometer 76, and any subsequent deviation from this balance is recorded to provide a measurement of the deviation of the capacitance of probe element 10 from the original value. The electrical circuit can be checked and standardized periodically, if desired, by closure of switch 65. This results in probe 10 being disconnected from the circuit and a standard condenser 68 being connected in place thereof. Closure of switch 65 also results in potentiometer 76 being disconnected and a standard potentiometer 78 being connected in place thereof. If the circuit is operating properly, recorder 81 indicates a fixed value with switch 65 closed. Any deviation from this fixed value indicates that the circuit has changed in some manner such that a new calibration is needed.

Figure 3:
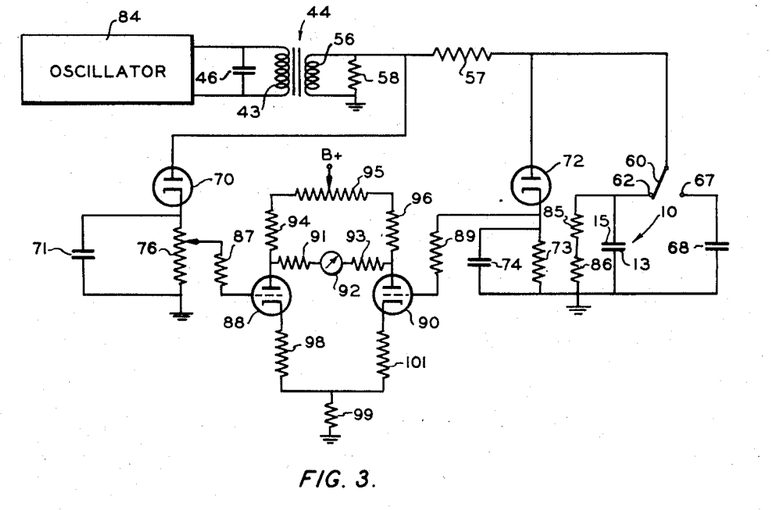
Figure 3 is a schematic circuit diagram of a second embodiment of the impedance measuring apparatus.

In Figure 3 there is illustrated a second embodiment of the measuring circuit, which is generally similar to the circuit of Figure 2, and wherein corresponding parts are designated by like reference numerals. An oscillator 84 provides an alternating potential. The contactor of potentiometer 76 is connected through a resistor 87 to the control grid of a first vacuum tube triode 88. The cathode of diode 72 is connected through a resistor 89 to the control grid of a second vacuum tube triode 90. The anode at triode 88 is connected through a resistor 91 to one terminal of a current meter 92 and the anode of triode 90 is connected through a resistor 93 to the second terminal of meter 92. The anode of triode 88 also is connected through a resistor 94 to one end terminal of a potentiometer 95, the contactor of which is maintained at a positive potential B+. The anode of triode 90 is connected to the second end terminal of potentiometer 95 through a resistor 96. The cathode of triode 88 is connected to ground through series resistors 98 and 99 and the cathode of triode 90 is connected to ground through series resistors 101 and 99. Triodes 88 and 90 and meter 92 thus function as a vacuum tube voltmeter to measure the difference in potential applied to the grids of two triodes. This, in turn, measures the electrical unbalance of the bridge circuit having probe element 10 in one arm thereof.

In the circuit of Figure 3, series connected resistors 85 and 86 are connected in shunt with probe 10. The purpose of these resistors is to compensate for any temperature deviation in the dielectric between electrode 15 and tube 13. In any given liquid, the capacity of the probe unit is constant at any given temperature, and the corresponding voltage appearing across the probe unit is constant. However, any deviation in temperature causes a change in the capacity of the probe and also in the voltage thereacross. Assuming the dielectric material under measurement has a negative temperature coefficient, then the voltage across the probe rises with an increase in temperature. In order to correct for this deviation, resistor 85, which has a large negative temperature coefficient of resistivity, is employed. By adjusting the ratio of resistor 85 to resistor 86, the latter having a positive temperature coefficient of resistivity, the sum of the resistances can be made to vary with temperature to maintain the voltage across probe 10 constant. Resistors 85 and 86 should be in thermal contact with the material under measurement so as to change temperature therewith. Resistors 85 and 86 obviously can be used with Figure 2 if desired.

Figure 4:
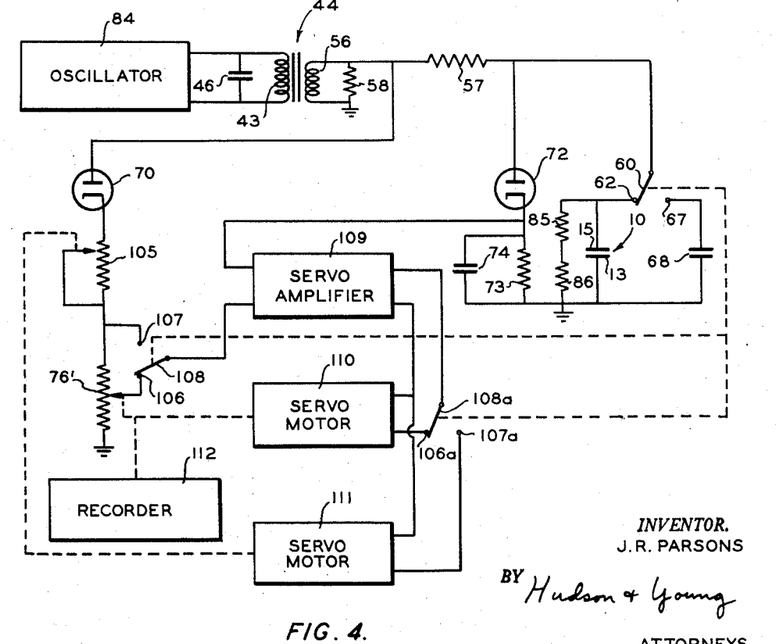
Figure 4 is a schematic circuit diagram of a third embodiment of the impedance measuring apparatus incorporating a servo system to maintain the bridge circuit in electrical balance.

In Figure 4 there is shown an electrical measuring circuit which is generally similar to that shown in Figure 3. The measuring circuit of Figure 4, however, incorporates a servo system to provide a self-balancing bridge circuit. The cathode of diode 70 is connected to one end terminal of a variable resistor 105. The second end terminal of resistor 105 is connected to the first end terminal of a potentiometer 76', the second end terminal of which is grounded. The contactor of potentiometer 76' is connected to a switch contact 106, and the first end terminal of potentiometer 76' is connected to a switch contact 107. A switch arm 108 normally engages contact 106 and is connected to the first input terminal of a servo amplifier 109. The second input terminal of servo amplifier 109 is connected to the cathode of diode 72. One output terminal of servo amplifier 109 is connected to one input terminal of a first servo motor 110 and to one input terminal of a second servo motor 111. The second output terminal of servo amplifier 109 is connected to a switch arm 108a. Switch arm 108a normally engages a first contact 106a which is connected to the second input terminal of servo motor 110. The second contact 107a associated with switch arm 108a is connected to the second input terminal of servo motor 111. The drive shaft of servo motor 110 is connected to the contactor of potentiometer 76' and the drive shaft of servo motor 111 is connected to the contactor of variable resistor 105. Switch arms 108 and 108a are mechanically coupled to switch arm 60 such that servo motor 110 is connected to amplifier 109 and the contactor of potentiometer 76' is connected to amplifier 109 when probe 10 is connected in the bridge circuit. When switch arm 60 is moved to connect capacitor 68 in the bridge circuit, servo motor 111 is connected to the output of amplifier 109 in place of servo motor 110 and the first end terminal of potentiometer 76' is connected to amplifier 109.

In normal operation of the circuit of Figure 4, probe 10 is connected in circuit and servo motor 110 adjusts the contactor of potentiometer 76' as needed to maintain the bridge circuit in a balanced condition. The magnitude of this movement of the contactor of potentiometer 76' is a function of the deviation of the dielectric constant of the material between electrode 15 and tube 13 of probe 10. This movement of the contactor of potentiometer 76' is recorded by a unit 112 which is connected to the drive shaft of motor 110. Movement of switch arm 60 results in variable resistor 105 being adjusted by motor 111 to compensate for any deviation in the circuit components from their preselected values, capacitor 68 being connected in circuit in place of probe 10.

Figure 5:
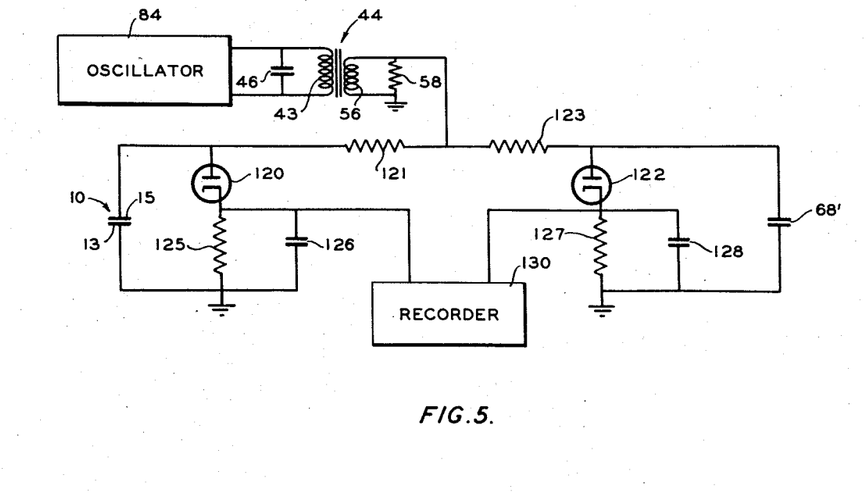
Figure 5 is a schematic circuit diagram of a fourth embodiment of the impedance measuring apparatus.

In Figure 5 there is illustrated a modified form of measuring circuit wherein the capacitance of probe 10 is compared directly with the capacitance of a reference probe 68' which is filled with a material similar to that under analysis. In this circuit one end terminal of transformer winding 56 is grounded and the second end terminal thereof is connected to the anode of a diode 120 through a resistor 121 and to the anode of a diode 122 through a resistor 123. The cathode of diode 120 is grounded through a resistor 125 which is shunted by a capacitor 126. The cathode of diode 122 is grounded through a resistor 127 which is shunted by a capacitor 128. Electrode 15 of probe 10 is connected to the anode of diode 120 and tube 13 of probe 10 is grounded. The first terminal of probe 68' is connected to the anode of diode 122 and the second terminal of probe 68' is grounded. The cathode of diode 120 is connected to one input terminal of a recorder 130 and the cathode of diode 122 is connected to the second input terminal of recorder 130. The circuit of Figure 5, therefore, comprises an electrical bridge circuit wherein resistors 121 and 123 form two arms of the bridge and probe 10 and probe 68' form the second arms of the bridge. Any unbalance of this bridge is recorded by unit 130 such that a continuous record of any deviation in the capacitance of probe 10 from the capacitance of probe 68' is recorded. This arrangement is particularly useful where probe 10 and probe 68' are maintained at the same temperature.

Figures 6, 7:
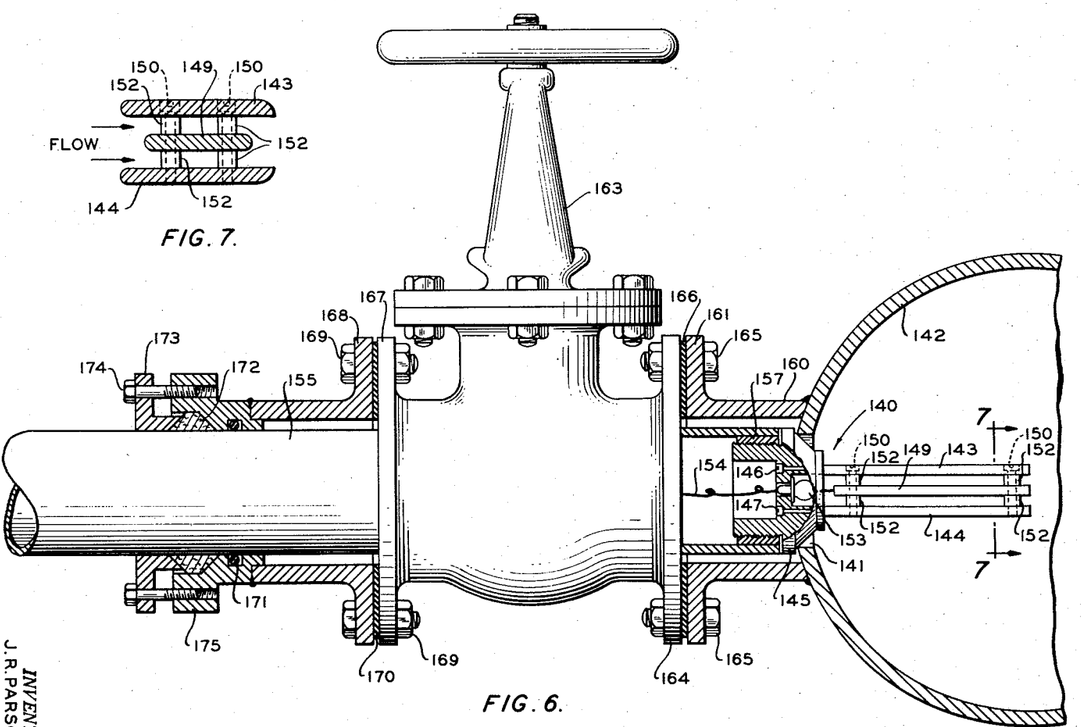
Figure 6 is a view, shown partially in section, of a valve assembly for inserting the probe in a container.
Figure 7 is a sectional view taken along line 7—7 in Figure 6.

In Figures 6 and 7 there is illustrated a second configuration of capacitance probe element that is particularly adapted for use in a conduit to measure the dielectric properties of flowing fluids. This probe 140 is shown inserted through an opening 141 in a conduit 142. Probe 140 comprises a pair of spaced metallic plates 143 and 144 which are attached to a housing plug 145 by respective screws 146 and 147. A third metallic plate 149 is interposed between plates 143 and 144 and screws 150 serve to hold the three plates in spaced relation with one another. These screws pass through insulating plugs 152 which retain plate 149 electrically insulated from plates 143 and 144. An insulator 153 is mounted in plug 145 and an electrical lead 154 passes through insulator 153 to engage plate 149. An elongated cylindrical housing member 155 is attached at one end to plug 145 and a bushing 157 is interposed therebetween.

This capacitance probe unit conveniently is inserted in conduit 142 through a suitable valve assembly. A nipple 160 is welded to conduit 142 so as to enclose opening 141. Nipple 160 is formed with a flanged end 161 to which a gate valve 163 having a first annular plate 164 attached thereto is secured by bolts 165. A gasket 166 is interposed between nipple 160 and valve 163. A second annular plate 167 is attached to the second opening of valve 163 and this second plate 167 is in turn secured to a flanged nipple 168 by a plurality of bolts 169. A gasket 170 is interposed between nipple 168 and plate 167. An annular packing gland assembly 175 is welded to the second end of nipple 168. This packing gland houses an O-ring 171 which engages housing 155. A quantity of packing material 172 is also contained in assembly 175. A packing retaining plate 173 is attached to the end of packing gland 170 by a plurality of screws 174. By this arrangement the probe element can readily be inserted in conduit 142 by opening gate valve 163. When so positioned, assembly 175 prevents leakage.

Capacitor plates 143, 144 and 149 are streamlined in the manner illustrated in Figure 7. The leading edges of plates 143 and 144 are completed rounded and the trailing edges of these two plates are half rounded. Both the leading and trailing edges of plate 149 are completely rounded. This particular configuration reduces turbulence in the flowing fluid and enables a more accurate reading of the dielectric properties of the fluid to be obtained. Plates 143 and 144 are electrically connected to one another through plug 145 which is maintained at ground potential. In this manner the outer plates form one capacitor element with respect to the inner plate and shield the inner plate from the effects of metallic conduit 142. This latter feature also enables a more accurate measurement of the dielectric properties of the fluid to be made. It should be noted that this second probe element 140 can be inserted in the circuitry of Figures 2, 3, 4 and 5 wherever desired in place of probe element 10.

Figure 8:
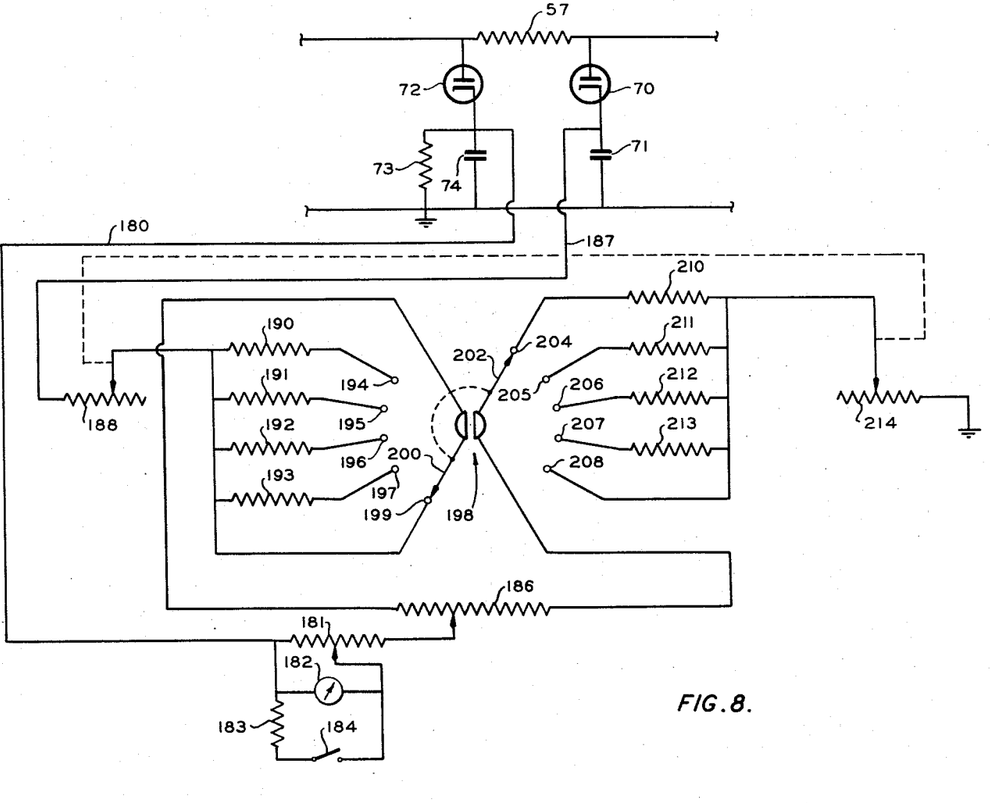
Figure 8 is a schematic circuit diagram of a modified form of the bridge unbalance indicating circuit.

In Figure 8 there is shown a modified form of indicating circuit to measure the voltage difference between the cathodes of rectifiers 70 and 72. A lead 180 is connected between the cathode of rectifier 72 and one end terminal of a potentiometer 181. A meter 182 is connected between this first end terminal of potentiometer 181 and the contactor of potentiometer 181. Meter 182 is shunted by a resistor 183 and a switch 184. The second end terminal of potentiometer 181 is connected to the contactor of a second potentiometer 186. A lead 187 is connected between the cathode of rectifier 70 and one terminal of a variable resistor 188. The adjustable arm of resistor 188 is connected to the first end terminals of resistors 190, 191, 192 and 193. The second terminals of these latter resistors are connected to respective contacts 194, 195, 196 and 197 of a switch 198. A fifth terminal of switch 198 is connected to the arm of resistor 188. A switch arm 200 is adapted to engage selectively the terminals 194, 195, 196, 197 and 199 to connect these terminals to the first end terminal of potentiometer 186. The second end terminal of potentiometer 186 is connected to a second switch arm 202 of switch 198 which selectively engages terminals 204, 205, 206, 207 and 208. Switch arms 200 and 202 are mechanically connected such that switch arm 202 engages contacts 204, 205, 206, 207 and 208 when switch arm 200 engages respective contacts 199, 197, 196, 195 and 194. Contacts 204, 205, 206 and 207 are connected to the first end terminals of respective resistors 210, 211, 212 and 213. The second end terminals of these resistors and contact 208 are connected to the arm of a variable resistor 214. The end terminal of resistor 214 is grounded and the arms of resistors 188 and 214 are mechanically coupled.

In operating the measuring circuit of Figure 8, probe unit 10 is emptied and the arms of resistors 188 and 214 are adjusted in unison until a zero reading is obtained on meter 182. In obtaining such a zero reading, switch 184 first is closed until the circuit is nearly balanced and then switch 184 is opened to increase the sensitivity of meter 182. After the circuit is initially balanced the contactor of potentiometer 181 is adjusted to any desired value to vary the sensitivity of the measuring circuit. Following these initial adjustments, probe unit 10 is inserted in the material under measurement and the circuit is again balanced to measure the dielectric properties of the material in probe 10. The circuit is considered to be balanced when a null reading is obtained on meter 182. Switch 198 is first adjusted until the reading of meter 182 approaches zero. Following this, the contactor of potentiometer 186 is adjusted to obtain the final balance reading on meter 182. The combined readings of switch 198 and potentiometer 186 thus provides an indication of the dielectric properties of the material in which probe 10 is positioned. A series of such readings with different materials in the sample cell can be obtained in order to calibrate the instrument for use with materials under test.

As a specific example of the measuring circuit of Figure 8, the following circuit component values have been used. Resistors 188 and 214, 10,000 ohms each; potentiometer 181, 10,000 ohms; potentiometer 186, 2,000 ohms; resistors 190 and 210, 8,000 ohms each; resistors 191 and 211, 6,000 ohms each; resistors 192 and 212, 4,000 ohms each; resistors 193 and 213, 2,000 ohms each; and resistor 183, 100 ohms.

From the foregoing description it should be apparent that there is provided in accordance with this invention improved apparatus for measuring the impedance of an electrical element. This apparatus is particularly useful for measuring the impedance of a condenser which provides a measurement of dielectric properties of the material between the plates of the condenser. By use of the probe illustrated in Figure 1, it is possible to measure the liquid level in a container by positioning the tube such that variance in the level of the liquid under measurement results in variance of the quantity of the liquid dielectric between electrode 15 and tube 13. Since the dielectric constant of air and most gases is substantially unity, this provides a convenient method of measuring a liquid level in terms of the level of liquid between electrode 15 and tube 13.

While this invention has been described in conjunction with present preferred embodiments thereof, it should be apparent that the invention is not limited thereto.

What is claimed is:

1. Electrical measuring apparatus comprising, in combination, a source of electrical oscillations, first and second impedance elements connected in series relation, one of said impedance elements being under measurements, means for applying said source of oscillations across said series connected first and second impedance elements, third and fourth impedance elements and a first current rectifier connected in series relation in the order named, means for applying said source of oscillations across said series connected third and fourth impedance elements and said first current rectifier, direct current indicating means, a second current rectifier and a fifth impedance element connected in series relationship with one another and in parallel with said second impedance element, and means connecting said direct current indicating means between the junction between said second rectifier and said fifth impedance element and the junction between said third and fourth impedance elements.

2. Electrical measuring apparatus comprising, in combination, a pair of spaced electrodes adapted to have a material, the dielectric properties of which are to be measured, position between said electrodes, a source of electrical oscillations, a first impedance element connected in series relation with the condenser formed by said spaced electrodes, means for applying said source of oscillations across said series connected first impedance element and said condenser, second and third impedance elements and a first current rectifier connected in series relation in the order named, means for applying said source of oscillations across said series connected second and third impedance elements and said first current rectifier, direct current indicating means, a second current rectifier and a fifth impedance element connected in series relationship with one another and in parallel with said condenser, and means connecting said indicating means between the junction between said second rectifier and said fifth element and the junction between said second and third impedance elements.

3. The combination in accordance with claim 2 further comprising a first resistor having a positive temperature coefficient of resistivity, and a second resistor having a negative temperature coefficient of resistivity, said first and second resistors being connected in series relation and said series connected resistors being connected in parallel with the condenser formed by said spaced electrodes.

4. Electrical measuring apparatus comprising, in combination, a source of electrical oscillations having first and second output terminals, first and second impedance elements connected in series relation between said first and second terminals, a first current rectifier and a third impedance element connected in series relation between said first and second terminals, a second current rectifier and a fourth impedance element connected in series relation between the junction between said first and second impedance elements and said second terminal, fifth and sixth impedance elements connected in series relation between the junction between said first rectifier and said third impedance element and said second terminal, direct current indicating means, means connecting one input terminal of said current indicating means to the junction between said fifth and sixth impedance elements, and means connecting the second input terminal of said current indicating means to the junction between said second rectifier and said fourth impedance element.

5. Electrical measuring apparatus comprising, in combination, a pair of spaced electrodes adapted to have a material, the dielectric properties of which are to be measured, positioned between said electrodes, a source of electrical oscillations having first and second output terminals, a second impedance element connected in series relation with the condenser formed by said spaced electrodes, said series connected condenser and second impedance element being connected across said first and second terminals, a first current rectifier and a third impedance element connected in series relation between said first and second terminals, a second current rectifier and a fourth impedance element connected in series relation between the junction between said first and second impedance elements and said second terminal, a potentiometer having the end terminals thereof connected between the junction between said first rectifier and said third impedance element and said second terminal, direct current indicating means, means connecting one input terminal of said current indicating means to the contactor of said potentiometer, and means connecting the second input terminal of said current indicating means to the junction between said second rectifier and said fourth impedance element.

6. The combination in accordance with claim 5 further comprising a first resistor having a positive temperature coefficient of resistivity, and a second resistor having a negative temperature coefficient of resistivity, said first and second resistors being connected in series relation and said series connected resistors being connected in parallel with the condenser formed by spaced electrodes.

7. The combination in accordance with claim 5 further comprising a second condenser of predetermined capacitance, a second potentiometer, switching means to connect said second condenser in series with said second impedance element in place of the condenser formed by said spaced electrodes, switching means to connect the end terminals of said second potentiometer between the junction between said first rectifier and said third impedance element and said second terminal in place of said first potentiometer, and switching means to connect said first-mentioned terminal of said current indicating means to the contactor of said second potentiometer in place of said first potentiometer.

8. Electrical measuring apparatus comprising, in combination, a pair of spaced electrodes adapted to have a material, the dielectric properties of which are to be measured, positioned between said electrodes, a source of electrical oscillations having first and second output terminals, a first resistor connected in series relation with the first condenser formed by said spaced electrodes, said series connected first condenser and said first resistor being connected across said first and second terminals, a first rectifier and a second condenser connected in series relation across said first and second terminals, a second rectifier and a third condenser connected in series relation across said first condenser, a second resistor connected in parallel with said third condenser, a potentiometer having the end terminals thereof connected between the junction between said first rectifier and said second condenser and said second terminal, direct current indicating means, means connecting one input terminal of said current indicating means to the contactor of said potentiometer, and means connecting the second input terminal of said current indicating means to the junction between said second rectifier and said third condenser.

9. Electrical measuring apparatus comprising, in combination, a crystal-controlled radio frequency oscillator, a tuned transformer having the primary winding thereof connected to the output of said oscillator, a high valued resistor connected in parallel with the secondary winding of said transformer, the end terminals of the secondary winding of said transformer forming first and second output terminals, a pair of spaced electrodes adapted to have a material the dielectric properties of which are to be measured positioned between said electrodes, a first resistor connected in series relation with the first condenser formed by said spaced electrodes, said series connected first condenser and said first resistor being connected across said first and second terminals, a first rectifier and a second condenser connected in series relation across said first and second terminals, a second rectifier and a third condenser connected in series relation across said first condenser, a second resistor connected in parallel with said third condenser, a potentiometer having the end terminals thereof connected between the junction between said first rectifier and said second condenser and said second terminal, direct current indicating means, means connecting one input terminal of said current indicating means to the contactor of said potentiometer, and means connecting the second input terminal of said current indicating means to the junction between said second rectifier and said third condenser.

10. The combination in accordance with claim 8 wherein said direct current indicating means comprises a direct current recorder, one input terminal of said recorder being connected to the junction between said second rectifier and said third condenser, and a second potentiometer, one end terminal of said second potentiometer being connected to said one input terminal of said recorder, the second end terminal of said second potentiometer being connected to the contactor of said first-mentioned potentiometer, the contactor of said second potentiometer being connected to the second input terminal of said recorder.

11. The combination in accordance with claim 8 wherein said direct current indicating means comprises a first vacuum tube having at least an anode, a cathode and a control grid; a second vacuum tube having at least an anode, a cathode and a control grid; means connecting the control grid of said first tube to the junction between said second rectifier and said third condenser, means connecting the control grid of said second tube to the contactor of said potentiometer, means for applying a positive potential to the anodes of said tubes, a direct current meter, and means connecting said direct current meter between the anodes of said tubes.

12. Electrical measuring apparatus comprising, in combination, a source of electrical oscillations having first and second output terminals, first and second impedance elements connected in series relation between said first and second terminals, a first current rectifier and a potentiometer connected in series relation between said first and second terminals, a second current rectifier and a fourth impedance element connected in series relation between the junction between said first and second impedance elements and said second terminal, a direct current responsive servo means having one input terminal thereof connected to the junction between said first rectifier and said third impedance element, the second input terminal of said servo means being connected to the contactor of said first potentiometer, the output of said servo means being connected to the contactor of said potentiometer, said servo means adjusting said contactor until there is a zero potential difference between the input terminals of said servo means.

13. Electrical measuring apparatus comprising, in combination, a pair of spaced electrodes adapted to have a material, the dielectrical properties of which are to be measured, positioned between said electrodes, a source of electrical oscillations having first and second output terminals, a first resistor connected in series relation with the first condenser formed by said spaced electrodes, said series connected first condenser and said resistor being connected across said first and second terminals, a first rectifier and a first potentiometer connected in series relation across said first and second terminals, a second rectifier and a second condenser connected in series relation with one another and in parallel with said first condenser, a second resistor connected in parallel with said second condenser, a direct current responsive servo amplifier having one input terminal thereof connected to the junction between said second rectifier and said second condenser, the second input terminal of said amplifier being connected to the contactor of said potentiometer, a servo motor actuated by the output of said amplifier, said servo motor being mechanically coupled to the contactor of said potentiometer to adjust the contactor of said potentiometer until there is a zero potential difference between the input terminals of said amplifier, and means to indicate the rotation of said motor.

14. The combination in accordance with claim 13 further comprising a third condenser of known capacitance; first switching means to selectively connect said third condenser in series with said first resistor in place of said first condenser; a variable resistor connected between said second rectifier and said potentiometer in series relation therewith; a second servo motor; second switching means to selectively connect said second motor to the output of said amplifier in place of said first-mentioned motor; third switching means to selectively connect said second-mentioned input terminal of said amplifier to the junction between said potentiometer and said variable resistor in place of to the contactor of said potentiometer; said first, second and third switching means operating in unison; and means connecting the output of said second motor to the adjustable contactor of said variable resistor.

15. The combination in accordance with claim 14 further comprising a first resistor having a positive temperature coefficient of resistivity, and a second resistor having a negative temperature coefficient of resistivity, said first and second resistors being connected in series relation and said series connected resistors being connected in parallel with the condenser formed by said spaced electrodes.

16. Electrical measuring apparatus comprising, in combination, a source of electrical oscillations, a first resistor and a first condenser connected in series relation, means for applying said source of oscillations across said series-connected first resistor and first condenser, a second resistor and a second condenser connected in series relation, means for applying said source of oscillations across said series-connected second resistor and second condenser, a first rectifier and a third resistor connected in series relation with one another and in parallel with said first condenser, a third condenser connected in parallel with said third resistor, a second rectifier and a fourth resistor connected in series relation with one another and in parallel with said second condenser, a fourth condenser connected in parallel with said fourth resistor, a direct current meter, one input terminal of said meter being connected to the junction between said first rectifier and said third resistor, the second input terminal of said meter being connected to the junction between said second rectifier and said fourth resistor.

17. Electrical measuring apparatus comprising, in combination, a pair of spaced electrodes adapted to have a material the dielectric properties of which are to be measured positioned between said electrodes, a source of electrical oscillations having first and second output terminals, a first resistor connected in series relation with the first condenser formed by said spaced electrodes, said series connected first condenser and said first resistor being connected across said first and second terminals, a first rectifier and a second condenser connected in series relation across said first and second terminals, a second rectifier and a third condenser connected in series relation across said first condenser, a second resistor connected in parallel with said third condenser, a first potentiometer, one end terminal of said first potentiometer being connected to the junction between said second rectifier and said third condenser, a first variable resistor, one end terminal of said first variable resistor being connected to the junction between said first rectifier and said second condenser, a first plurality of resistors, corresponding first terminals of each of said first plurality of resistors being connected to the second end terminal of said first variable resistor, a second plurality of resistors, a second variable resistor, one end terminal of said second variable resistor being connected to corresponding first terminals of each of said second plurality of resistors, a second potentiometer, one end terminal of said second potentiometer being connected selectively to the second end terminals of said first plurality of resistors, the second end terminal of said second potentiometer being connected selectively to the second end terminals of said second plurality of resistors, the contactor of said second potentiometer being connected to second end terminal of said first potentiometer, the adjustable arms of said first and second variable resistors being coupled, and a meter connected between the contactor and one end terminal of said first potentiometer.

18. Electrical measuring apparatus comprising a source of electrical oscillations having first and second output terminals, first and second impedance elements connected in series relation between said first and second terminals, a first current rectifier and a third impedance element connected in series relation with one another and in parallel with said second impedance element, direct current indicating means having one terminal thereof connected to the junction between said first rectifier and said third impedance element, a second current rectifier and a fourth impedance element connected in series relation between said first output terminal and the second terminal of said current indicating means, a fifth impedance element having one terminal thereof connected to said second output terminal, and means connecting the second terminal of said fifth impedance element to the second terminal of said current indicating means.

19. The combination in accordance with claim 18 wherein one of said second and fifth impedance elements comprises a pair of spaced electrodes adapted to have a material, the dielectric properties of which are to be measured, disposed therebetween.

References Cited in the file of this patent

UNITED STATES PATENTS

| | | |
|---|---|---|
| 2,200,863 | Schuck | May 14, 1940 |
| 2,349,992 | Schrader | May 30, 1944 |
| 2,574,261 | Hagan | Nov. 6, 1951 |
| 2,623,928 | Bower | Dec. 30, 1952 |
| 2,655,043 | Wolfe et al. | Oct. 13, 1953 |